United States Patent [19]
Meeker

[11] 3,760,893
[45] Sept. 25, 1973

[54] CYLINDER TYPE SOIL-SAMPLING AUGER

[76] Inventor: Ralph L. Meeker, 138 Glencoe Rd., Columbus, Ohio 43214

[22] Filed: Apr. 3, 1972

[21] Appl. No.: 240,654

[52] U.S. Cl. .............................................. 175/316
[51] Int. Cl. ............................................. E21b 11/00
[58] Field of Search .................. 175/18, 58, 20, 313, 175/315, 403, 316

[56] References Cited
UNITED STATES PATENTS

| | | | |
|---|---|---|---|
| 143,963 | 10/1873 | Clark | 175/316 |
| 934,029 | 9/1909 | West | 175/316 |
| 1,691,540 | 11/1928 | Birkenmaier | 175/316 |
| 1,877,067 | 9/1932 | Sharp | 175/316 |
| 2,657,910 | 11/1953 | Fleming | 175/316 |
| 517,892 | 4/1894 | Smith et al | 175/316 X |
| 528,695 | 11/1894 | Seniff | 175/316 |
| 1,222,460 | 4/1917 | Phillips | 175/316 |

*Primary Examiner*—David H. Brown
*Attorney*—William V. Miller et al.

[57] ABSTRACT

A soil-sampling auger of cylindrical tubular form with a leading open end in the form of an auger bit. The tubular auger consists of two substantially semicylindrical sections pivoted together at the trailing or closed end so that the sections can be swung apart to expose or remove the soil sample after the auger has been turned into the ground and then pulled out of the ground with the entrapped soil sample. The pivot arrangement between the sections is so designed that turning the auger into the ground exerts a force which keeps the sections closed.

3 Claims, 7 Drawing Figures

PATENTED SEP 25 1973 3,760,893
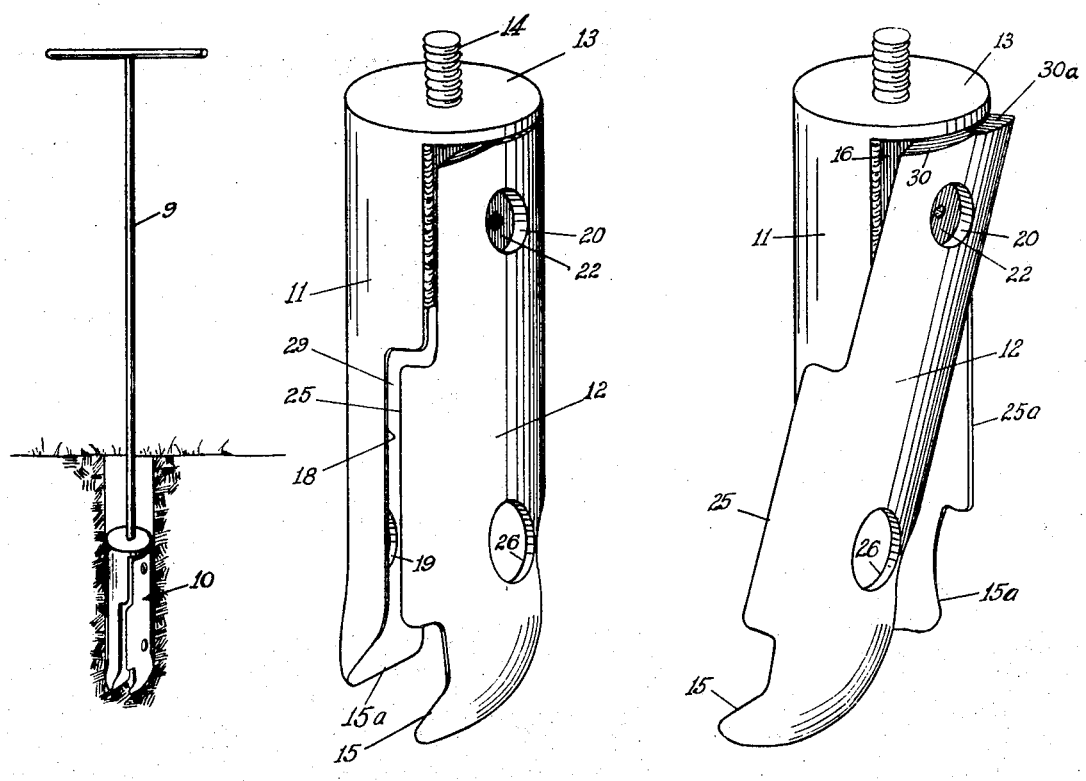
Fig 1  Fig 2  Fig 3
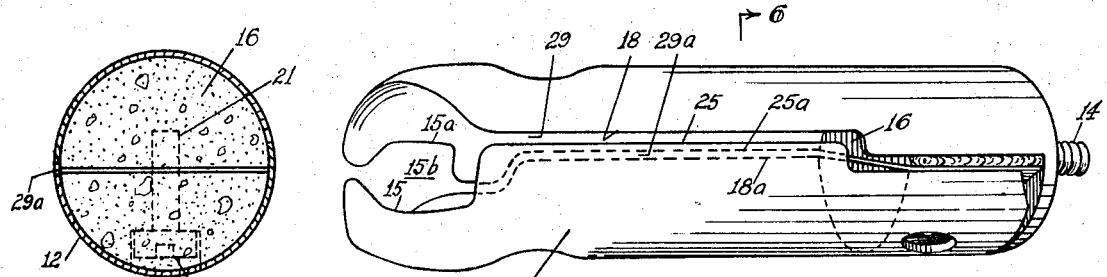
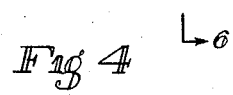
Fig 6  Fig 4
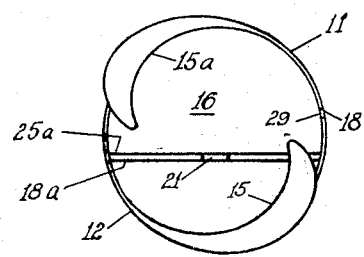
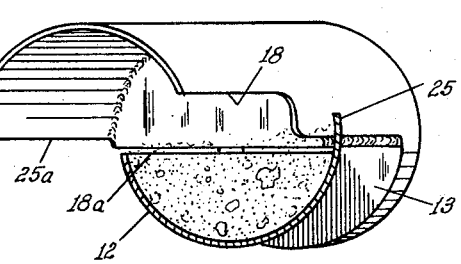
Fig 5  Fig 7

CYLINDER TYPE SOIL-SAMPLING AUGER

Hand-operated soil-sampling augers have been provided in the past which have been of cylindrical tubular one-piece form with an open auger bit leading end and a closed trailing end. When the auger was turned into the ground, it would fill with a sample of the soil. However, when withdrawn from the ground, the entrapped sample would be retained in the tubular auger and would be difficult to remove.

The present invention overcomes the disadvantages of the one-piece tubular auger by making it of two substantially semi-cylindrical half sections which are pivoted together at the trailing end of the auger. The auger functions to effectively bore into the soil and entrap a soil sample and when it is withdrawn, the sections can be readily spread apart for removal or inspection of the entrapped soil sample. As the auger is turned into the ground, clockwise, a reaction force is setup which keeps the sections in closed position.

The best mode contemplated in carrying out this invention is illustrated in the accompanying drawing in which:

FIG. 1 is a schematic view illustrating the use of a hand-operated soil-sampling auger of this invention.

FIG. 2 is an enlarged perspective view of the auger in closed condition.

FIG. 3 is a similar view but showing the auger opened for viewing or release of the entrapped soil sample.

FIG. 4 is an elevational view of the auger.

FIG. 5 is an end elevational view of the leading open end of the auger.

FIG. 6 is a transverse sectional view taken at the position indicated at line 6—6 of FIG. 4, but showing the closed auger filled with a soil sample.

FIG. 7 is a view similar to FIG. 6 but showing the pivoted sections of the auger swung apart to open position.

With specific reference to the drawing, in FIG. 1, there is illustrated the auger 10 on the lower end of a T-shaped handle 9, turned into the ground to entrap a soil sample. The auger is turned into the ground in a clockwise direction. The auger itself or head is illustrated in detail in the remaining Figures of the drawing.

The auger consists of the two substantially semi-cylindrical sections 11 and 12 which are disposed in longitudinally extending relationship normally to provide a substantially cylindrical tubular container which is open at its leading end and closed at its trailing end.

The section 11 has an integral disc-like closure 13 at its trailing end which carries a threaded projection 14 at its axis which is used to mount the auger on the handle 9. On its leading end, the section 11 has formed thereon part of the auger bit including a hook-shaped cutting edge 15a which will enter the ground as the auger is turned clockwise. Directly ahead of the disc 13 is a pivot-mounting plate or partition 16 which is provided with a diametrically extending portion and a transverse inner portion preferably welded to the section 11. The trailing edge of the section 11 opposite the hooked edge 15a is angularly offset or recessed, as indicated at 18, from the inner end of the partition 16 to the cutting edge 15a. Adjacent its hooked end the section 11 is also provided with a transverse opening 19.

The section 12 is somewhat similar to the section 11 but is provided with a transverse pivot-receiving opening 20. This opening receives the pivot bolt 21 which has a shank threaded into the diametrical portion of the partition 16 of the section 11 and a head 22 which is counter-sunk within the outer portion of the opening 20. At its leading end, the section 12 is provided with part of the auger bit in the form of a hook-shaped cutting edge 15. At its leading edge and adjacent the hook-shaped edge 15, the section 12 is provided with an arcuate extension 25 which is substantially complemental to the recessed edge 18 of the section 11 and extends thereinto when the two sections are in closed relationship. At its other edge, the section 12 is provided with a straight longitudinally extending edge 18a, and cooperating edge of the section 11 is provided with a straight longitudinally extending edge 25a. Thus, the cooperating edges 18 and 25 provide a longitudinal slot 29 and the cooperating edges 18a and 25a provide a longitudinal slot 29a. The slot 29a is in substantial alignment with the diametrical portion of the partition 16, whereas the slot 29 is angularly offset relative thereto. This arranges the slots so that they are not diametrically opposed but are angularly offset on opposite sides of a diametrical plane for a purpose which will later be clear. The section 12 is provided with transverse opening 26 which will align with the opening 19 in the section 11 when the two sections are in closed position relatively.

When the two sections 11 and 12 are in closed position relatively, the hook-shaped edges 15a and 15 of the respective sections cooperate to produce a substantially helix cutting bit. The hook shaped edges cooperate to provide an opening 15b in the bit end of the auger between the two sections to permit escape of excess earth as the boring progresses. The pivot structure at the opposite end of the auger permits swinging of the section 12 clockwise about the pivot 21 to open the container but prevents swinging in the opposite direction when subjected to reaction force resulting from turning the auger clockwise into the earth. Thus, the upper corner of the section 12, at the edge where the projection 25 is formed, is chamfered or bevelled at 30 to permit the necessary swinging movement in a clockwise direction but to limit this movement by contact with the inner surface of the adjacent disc 13. The opposite corner is flat, as indicated at 30a, and will contact with the disc 13 to prevent counterclockwise movement about the pivot 21 from its normally closed position in alignment with the section 11.

In using this device, the auger 10 is turned into the earth clockwise and will entrap a soil sample as shown in FIG. 6. During this screwing movement into the earth, the counterclockwise reaction force set up will be resisted by contact of the stop 30 with the disc 13 and thus the sections 11 and 12 will not swing apart. To remove the auger, it is pulled upwardly out of the earth. When it is desired to expose the entrapped soil sample, the section 11 is swung clockwise relative to the section 12, as indicated in FIG. 3, to expose the soil sample as indicated in FIG. 7. Opening 19 or 26 may be used to push out the sample in the respective section if it tends to adhere thereto. The cooperating edges 18–25 and 18a–25a at opposed sides of the auger prevent the soil sample from pushing through the tubular auger, as it is turned into the earth, since the slots 29 and 29a resulting therefrom are offset angularly relatively.

It will be apparent that the above invention provides a simple inexpensive hand-operated soil-sampling auger. It is simple to use and simple to open to gain access to the soil sample. Thus, the disadvantages of the solid one piece art cylinder or bucket-type soil auger are overcome. With this prior art device, the soil sample is entrapped tightly within the walls of the cylinder, or bucket and between the boring teeth, particularly with samples that are significantly fine-textured and are moist. Unloading with such a device is achieved laboriously by using a prying object or repeatedly striking the auger on the ground until the soil sample mass can be loosened and removed, which is a time consuming procedure. The present invention provides a device in which the sections can be opened easily to expose and remove the soil sample. However, the device is so designed that it will not open accidentally as it is screwed into the ground.

Having thus described the invention what is claimed is:

1. An auger soil sampler having a substantially cylindrical tubular body with an open leading bit end for boring into the soil and a closed trailing end, said body comprising a pair of substantially semi-cylindrical sections pivoted together adjacent said trailing end for relative swinging to provide for opening to expose an entrapped soil sample, each of said sections having part of the bit end formed thereon at the leading end thereof, said sections being pivoted by means of a pivot at the trailing end of the body which extends transversely of the axis thereof, the parts of the bit end formed on the respective sections being so shaped that turning of the body in a clockwise direction will cause it to enter the earth, one section being pivoted to the other section for swinging in a clockwise direction about the pivot to open the body, and stop means between the two sections for preventing movement of that section in a counterclockwise direction about the pivot as the body is turned into the earth, said trailing end of the auger being closed by a disc carried by the one end of one section and extending outwardly beyond the axis thereof, a partition mounted on that section axially inwardly of the disc and in a diametrical plane corresponding to the inner edges of that semicylindrical section, said pivot being a pivot pin mounted in said partition to provide the pivot for swinging of the other section, the later section having a corner which will contact with the disc to prevent swinging in a counterclockwise direction about the pivot pin but having an opposed bevelled corner to permit swinging in a clockwise direction but to eventually contact the disc to limit that movement in that direction.

2. An auger soil sampler according to claim 1 in which each of the sections has longitudinal edges which almost meet with and cooperate with longitudinal edges of the other section to provide a pair of angularly spaced longitudinal slots when the sections are closed the longitudinal slots between the two sections being offset angularly relative to a diametrical plane.

3. An auger soil sampler having a substantially cylindrical tubular body with an open leading bit end for boring into the soil and a closed trailing end, said body comprising a pair of substantially semicylindrical sections pivoted together adjacent said trailing end for relative swinging to provide for opening to expose an entrapped soil sample, each of said sections having part of the bit end formed thereon at the leading end thereof, each of the sections having longitudinal edges which cooperate to provide longitudinal slots angularly displaced on opposite sides of a plane passing diametrically through the axis of the body.

* * * * *